(12) United States Patent
Chen et al.

(10) Patent No.: US 12,000,022 B2
(45) Date of Patent: *Jun. 4, 2024

(54) HIGH ENTROPY ALLOY ARTICLE, PRODUCT FORMED OF SAID HIGH ENTROPY ALLOY ARTICLE, AND FLUID MACHINE HAVING SAID PRODUCT

(71) Applicant: Proterial, Ltd., Tokyo (JP)

(72) Inventors: Meichuan Chen, Tokyo (JP); Tadashi Fujieda, Tokyo (JP); Kousuke Kuwabara, Tokyo (JP)

(73) Assignee: Proterial, Ltd., Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 16/636,504

(22) PCT Filed: Oct. 31, 2018

(86) PCT No.: PCT/JP2018/040471
§ 371 (c)(1),
(2) Date: Feb. 4, 2020

(87) PCT Pub. No.: WO2019/088157
PCT Pub. Date: May 9, 2019

(65) Prior Publication Data
US 2020/0290118 A1    Sep. 17, 2020

(30) Foreign Application Priority Data

Oct. 31, 2017 (JP) ................................ 2017-210367
Oct. 31, 2017 (JP) ................................ 2017-210370

(51) Int. Cl.
*B33Y 70/00* (2020.01)
*B22F 10/28* (2021.01)
(Continued)

(52) U.S. Cl.
CPC ............ *C22C 19/053* (2013.01); *B33Y 70/00* (2014.12); *C22C 19/07* (2013.01); *C22C 30/00* (2013.01);
(Continued)

(58) Field of Classification Search
None
See application file for complete search history.

(56) References Cited

U.S. PATENT DOCUMENTS 5,169,463 A * 12/1992 Doherty ................ C22C 19/055
148/408
6,478,897 B1 * 11/2002 Izumida ................ C22C 19/055
148/428
(Continued)

FOREIGN PATENT DOCUMENTS

CN     101130844 A      2/2008
CN     106756407 A  *   5/2017
(Continued)

OTHER PUBLICATIONS

Chou et al. The effect of molybdenum on the corrosion behavior of the high-entropy alloys Co1.5CrFeNi1.5Ti0.5Mox in aqueous environments. Corrosion Science 52 (2010) 2571-2581. (Year: 2010).*
(Continued)

*Primary Examiner* — Paul A Wartalowicz
*Assistant Examiner* — Stephani Hill
(74) *Attorney, Agent, or Firm* — Volpe Koenig

(57) ABSTRACT

An object of the invention is to provide an alloy article that exhibits even better mechanical properties and/or even higher corrosion resistance than conventional high entropy articles without sacrificing the attractive properties thereof, a product formed of the alloy article, and a fluid machine having the product. An alloy article according to the invention has a predetermined chemical composition consisting of (Continued)

Co, Cr, Fe, Ni and Ti, Mo within a range of 1 atomic % or more and 5 atomic % or less, an element with a larger atomic radius than the atomic radiuses of Co, Cr, Fe and Ni within a range of more than 0 atomic % and 4 atomic % or less, and a balance of inevitable impurities.

14 Claims, 9 Drawing Sheets

(51) Int. Cl.
| | |
|---|---|
| B33Y 80/00 | (2015.01) |
| C22C 19/05 | (2006.01) |
| C22C 19/07 | (2006.01) |
| C22C 30/00 | (2006.01) |
| C22F 1/10 | (2006.01) |
| F04D 29/02 | (2006.01) |
| B22F 9/08 | (2006.01) |
| B22F 10/64 | (2021.01) |

(52) U.S. Cl.
CPC ............... *C22F 1/10* (2013.01); *F04D 29/02* (2013.01); *B22F 9/082* (2013.01); *B22F 10/28* (2021.01); *B22F 10/64* (2021.01); *B33Y 80/00* (2014.12)

(56) References Cited

U.S. PATENT DOCUMENTS

| | | |
|---|---|---|
| 2008/0031769 A1 | 2/2008 | Yeh |
| 2018/0363104 A1 | 12/2018 | Fujieda et al. |
| 2019/0047049 A1 | 2/2019 | Fujieda et al. |

FOREIGN PATENT DOCUMENTS

| | | |
|---|---|---|
| JP | 2002-173732 A | 6/2002 |
| WO | 2017/098848 A1 | 6/2017 |
| WO | 2017/138191 A1 | 8/2017 |

OTHER PUBLICATIONS

CN 106756407 machine translation (Year: 2017).*
Chou et al. Effect of molybdenum on the pitting resistance of Co1.5CrFeNi1.5Ti0.5Mox alloys in chloride solutions. Corrosion—Aug. 2011. vol. 67, No. 8. 85002 (Year: 2011).*
Sung et al. Mechanical property of single phase Co—Ni—Cr—Mo based superalloy produced by cold working and recrystallization heat treatment. Materials Science Forum (2004), 449-452 (Pt. 1, Designing, Processing and Properties of Advanced Engineering Materials), 573-576. (Year: 2004).*
Otto et al. The influences of temperature and microstructure on the tensile properties of a CoCrFeMnNi high-entropy alloy. Acta Materialia 61 (2013) 5743-5755. (Year: 2013).*
Extended European Search Report dated Feb. 19, 2021 for European Patent Application No. 18874134.2.
Fujieda Tadashi et al., "CoCrFeNiTi-based high-entropy alloy with superior tensile strength and corrosion resistance achieved by a combination of additive manufacturing using selective electron beam melting and solution treatment," Materials Letters 189, pp. 148-151 (2017).
International Search Report, PCT/JP2018/040471, dated Jan. 15, 2019, 1 pg.
Singapore Second Written Opinion dated Sep. 14, 2021 for Singapore Patent Application No. 11202000962Q.

* cited by examiner

HIGH ENTROPY ALLOY ARTICLE, PRODUCT FORMED OF SAID HIGH ENTROPY ALLOY ARTICLE, AND FLUID MACHINE HAVING SAID PRODUCT

TECHNICAL FIELD OF THE INVENTION

The present invention relates to the technology of alloys with excellent corrosion resistance and mechanical properties and, in particular, to an alloy article referred to as high entropy alloy, a product formed of the alloy article, and a fluid machine having the product.

DESCRIPTION OF BACKGROUND ART

A high entropy alloy (HEA) has recently been developed as an alloy based on a new technological concept which is completely different from the concept of conventional alloys (e.g., an alloy in which a tiny amount of multiple kinds of subcomponent elements is added to one to three kinds of main component elements). The HEA is defined as an alloy configuring more than five kinds of main metallic elements, each having a content of 5 to 35 atomic %, and it is known that the HEA expresses characteristics as described below.

They can be enumerated, e.g., (a) stabilization of the mixed state resulting from the negatively-increasing mixing entropy term in the formula of Gibbs free energy; (b) atomic diffusion delay due to complicated microstructure; (c) improved mechanical characteristics resulting from high lattice distortion due to different sizes of constituent atoms; and (d) improved corrosion resistance as the result of combined effects of coexistence of multiple elements (also referred to as a "cocktail effect").

For example, Patent Literature 1 (JP 2002-173732 A) discloses a high entropy multicomponent alloy produced by casting or synthesizing multiple kinds of metallic elements, wherein the alloy contains five to eleven kinds of main metallic elements and the molar number of each kind of main metallic element is 5% to 30% of the total molar number of the alloy. Furthermore, the main metallic elements are selected from a metallic element group containing aluminum (Al), titanium (Ti), vanadium (V), chromium (Cr), iron (Fe), cobalt (Co), nickel (Ni), copper (Cu), zirconium (Zr), molybdenum (Mo), palladium (Pd), and silver (Ag).

According to Patent Literature 1, there can be provided a high entropy multicomponent alloy with higher hardness, higher heat resistance, and higher corrosion resistance, in a cast state, than conventional carbon steels and alloy carbon steels. However, this high entropy multicomponent alloy is hard to process due to its high hardness and temper softening resistance, which makes it difficult to fabricate a member with a desired shape by plastic working or machining.

As a solution to the above problem with Patent Literature 1, Patent Literature 2 (WO 2017/138191 A1) discloses an alloy member having a chemical composition including Co, Cr, Fe, Ni and Ti, each within a range of 5 atomic % or more and 35 atomic % or less, Mo within a range of more than 0 atomic % and 8 atomic % or less, and a balance of inevitable impurities. In the alloy member, ultrafine particles with an average particle size of 40 nm or less are dispersedly precipitated in matrix phase crystals.

According to Patent Literature 2, there can be provided an alloy member that is formed of a high entropy alloy with high mechanical strength and high corrosion resistance and is excellent in alloy composition, microstructural homogeneity, and shape controllability.

CITATION LIST

Patent Literature

Patent literature 1: JP 2002-173732 A; and
Patent literature 2: WO 2017/138191 A1.

SUMMARY OF THE INVENTION

Problems to be Solved by the Invention

At present, research is being conducted on possible uses of high entropy alloys as materials for oil well equipment for drilling for crude oil and natural gas and materials for chemical plants. Since oil well equipment is used in a severe environment of oil well drilling (e.g., exposed to a highly corrosive gas or liquid in an intermediate temperature range, i.e., at a temperature of up to around 350° C.), its materials are required to have high corrosion resistance.

With the recent trend toward greater depths in oil well drilling, the stress under which oil well equipment is operated has inevitably become higher than ever before, requiring alloy materials for oil well equipment to have better mechanical properties.

The alloy member disclosed in Patent literature 2 is considered to be highly promising as it exhibits excellent shape controllability and ductility without sacrificing characteristics as an HEA (e.g., excellent mechanical properties and high corrosion resistance). However, considering the severer usage environment due to the increasing drilling depth, it is desired that even better mechanical properties (e.g., tensile strength and hardness) and even higher corrosion resistance than the alloy member of Patent literature 2 be achieved.

Improving tensile strength contributes to, e.g., increasing the rotational speed of a rotary member in a fluid machine (i.e., increasing the discharge flow or pressure of the fluid machine). Also, improving hardness contributes to improving the erosion resistance of a rotary member in a fluid machine (i.e., improving the durability of the fluid machine).

In view of the above, it is an objective of the present invention to provide an alloy article that exhibits even better mechanical properties and/or even higher corrosion resistance than conventional HEA articles without sacrificing the attractive properties of conventional HEAs (excellent mechanical properties and high corrosion resistance), a product formed of the alloy article, and a fluid machine having the product.

Solution to Problems (I) According to one aspect of the present invention, there is provided an alloy article which has a predetermined chemical composition. The chemical composition includes: Co, Cr, Fe, Ni and Ti, each within a range of equal to or more than 5 atomic % and equal to or less than 35 atomic %; Mo within a range of more than 0 atomic % and less than 8 atomic %; an element with a larger atomic radius than the atomic radiuses of the Co, Cr, Fe and Ni within a range of more than 0 atomic % and equal to or less than 4 atomic %; and a balance of inevitable impurities.

In the above alloy article (I) of the invention, the following modifications and changes can be made.

(i) The element with a larger atomic radius may be at least one from among Ta (tantalum), Nb (niobium), Hf (hafnium), Zr (zirconium), and Y (yttrium).

(ii) A total content of the element with a larger atomic radius and the Mo may be equal to or less than 8 atomic %.

(iii) The chemical composition may comprise: the Co within a range of equal to or more than 20 atomic % and equal to or less than 35 atomic %; the Cr within a range of equal to or more than 10 atomic % and equal to or less than 25 atomic %; the Fe within a range of equal to or more than 10 atomic % and equal to or less than 25 atomic %; the Ni within a range of equal to or more than 15 atomic % and equal to or less than 30 atomic %; and the Ti within a range of equal to or more than 5 atomic % and equal to or less than 15 atomic %.

(iv) The alloy article may be a powder.

(v) The alloy article may be a formed article, and the formed article may comprise: matrix phase crystal grains and ultrafine particles with an average particle size of 100 nm or less, the ultrafine particles being dispersedly precipitated in the matrix phase crystal grains.

(vi) The ultrafine particles may comprise crystalline particles in that the Ni and the Ti are concentrated than in the matrix phase crystal grains.

(vii) The ultrafine particles may further comprise crystalline particles in that the element with a larger atomic radius is concentrated than in the matrix phase crystal grains.

(viii) A product of a half of the average particle size of the ultrafine particles and a volume ratio of the ultrafine particles to the matrix phase crystal grains may be 16 nm or less.

(ix) The matrix phase crystal grains may be equiaxed crystals with an average crystal grain size of equal to or less than 150 μm, and the equiaxed crystals may comprise face-centered cubic crystals or a mixture of face-centered cubic crystals and simple cubic crystals.

(II) According to another aspect of the invention, a product formed of an alloy article is provided. The alloy article is the above-described alloy article, and the product has a corrosion rate of less than 0.9 g/m²/h when the product is immersed in 5% boiling sulfuric acid at 375 K.

In the above product (II) of the invention, the following modifications and changes can be made.

(x) The corrosion rate may be less than 0.5 g/m²/h.

(xi) The product may be an impeller of a fluid machine.

(III) According to still another aspect of the invention, there is provided a fluid machine which incorporates the above-described impeller.

In the above fluid machine (III) of the invention, the following modifications and changes can be made.

(xii) The fluid machine may be a compressor or a pump.

Advantages of the Invention

According to the present invention, it is possible to provide an alloy article that exhibits even better mechanical properties and/or even higher corrosion resistance than conventional HEA articles without sacrificing the attractive properties of conventional HEAs. Furthermore, it is possible to provide a product formed of the alloy article, and a fluid machine having the product.

Meanwhile, it is considered to depend on the kind or portion of the oil well equipment whether to give higher priority to either the mechanical properties or the corrosion resistance of the alloy article or the product, or to place a high premium on the balance between the two. Therefore, in the invention, it is deemed sufficient if at least either the mechanical properties or the corrosion resistance is improved without sacrificing the properties of conventional HEAs.

Figure 1:
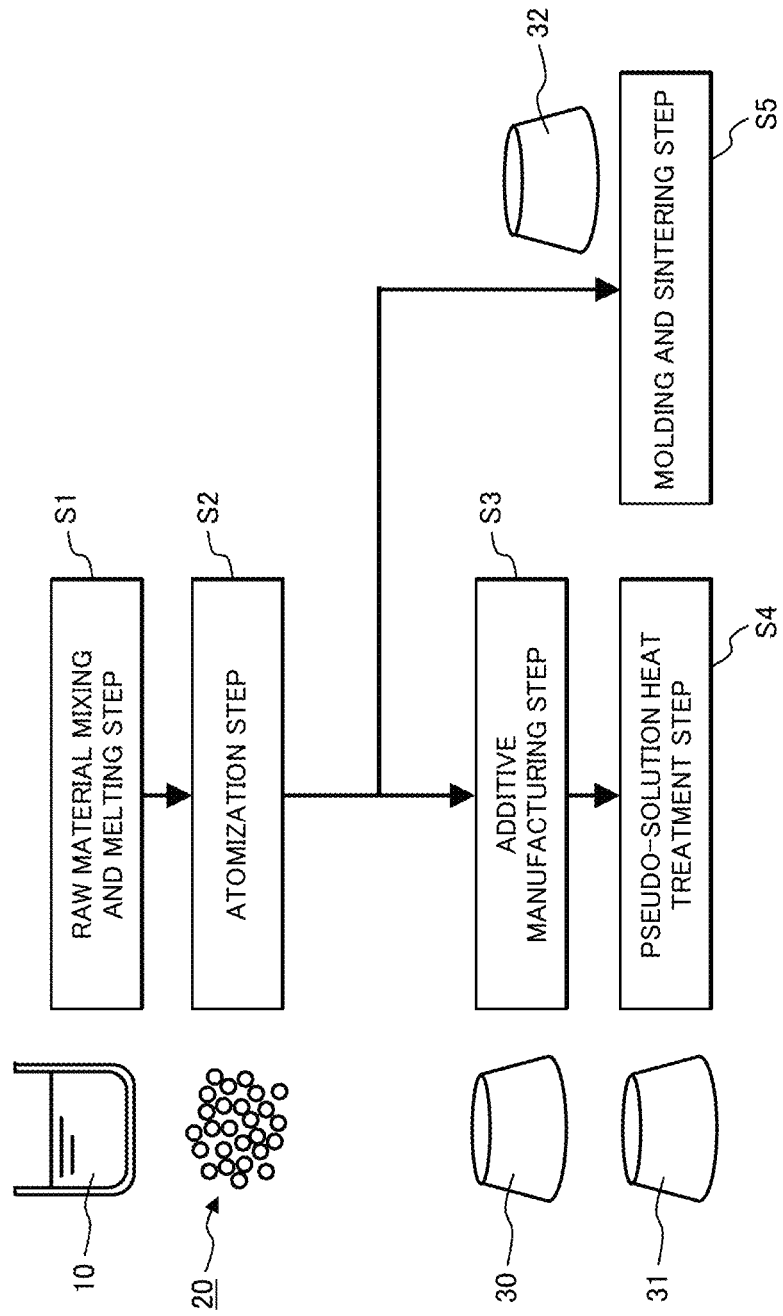
FIG. 1 is an exemplary process chart showing a method for manufacturing an alloy article according to the present invention.

DETAILED DESCRIPTION OF THE PREFERRED EMBODIMENTS (Basic Concept of the Present Invention)

The present inventors, with an aim to develop an alloy article that exhibits even better mechanical properties and/or even higher corrosion resistance than conventional HEA articles without sacrificing the attractive properties of conventional HEAs (excellent mechanical properties and high corrosion resistance), focused their attention on "improving mechanical properties attributable to high lattice strain caused by the difference in size between constituent atoms" and "improving corrosion resistance by a cocktail effect" among the aforementioned characteristics of HEAs.

The inventors investigated the atomic radiuses of the constituent elements in Patent literature 2 (WO 2017/138191 A1) and found that the atomic radius of Co is 125 μm, the atomic radius of Cr is 128 μm, the atomic radius of Fe is 126 μm, the atomic radius of Ni is 124 μm, the atomic radius of Ti is 147 μm, and the atomic radius of Mo is 139 μm and that Ti and Mo are much larger in size than those of the other constituent elements. They believed that the presence of these large-sized components of Ti and Mo probably contributes to the mechanical properties and corrosion resistance in Patent literature 2.

In view of the above, the inventors formulated a hypothesis that the mechanical properties and corrosion resistance can be further improved by adding an element with an atomic radius equal to or larger than those of Ti and Mo to further enhance the degree of the high lattice strain and the cocktail effect, and conducted intensive research on the relationship among the alloy composition, the microstructure, the mechanical properties, and the corrosion resistance. As a result, they have found that there can be obtained an alloy article that exhibits better mechanical properties and/or higher corrosion resistance than conventional alloy articles through the addition of an element with an atomic radius comparable to or larger than that of Ti to a conventional Co-Cr-Fe-Ni-Ti-Mo-based alloy.

Specifically, the inventors have found that there can be achieved an alloy article that exhibits better mechanical properties (e.g., Vickers hardness, tensile strength) and/or higher corrosion resistance (e.g., the corrosion rate in a sulfuric acid corrosion test) than conventional alloy articles through the addition of at least one of Ta (atomic radius of 146 μm), Nb (atomic radius of 146 μm), Hf (atomic radius of 159 μm), Zr (atomic radius of 160 μm), and Y (atomic radius of 180 μm), as an element with an atomic radius comparable to or larger than that of Ti, within a range of more than 0 atomic % and 4 atomic % or less. The present invention has been made based on this finding.

Hereinafter, preferred embodiments of the invention will be described with reference to the drawings according to the alloy article production procedures. However, the invention is not limited to specific embodiments described below, and various combinations and modifications are possible without departing from a technical concept of the invention.

[Method for Manufacturing Alloy Article]

FIG. 1 is an exemplary process chart showing a method for manufacturing an alloy article according to the invention. As shown in FIG. 1, the method for manufacturing an alloy article according to the invention includes at least a raw material mixing and melting step (S1) and an atomization step (S2). It further includes an additive manufacturing step (S3), a pseudo-solution heat treatment step (S4), and a molding and sintering step (S5), as appropriate. Each step will be hereinafter described more specifically.

(Raw Material Mixing and Melting Step)

The raw material mixing and melting step is performed in which molten metal 10 is formed by mixing and melting raw materials having desired alloy composition. A raw material mixing method and a melting method are not particularly limited, and any conventional method can be utilized.

The alloy composition according to the invention includes five elements, Co, Cr, Fe, Ni and Ti, as main components, each within a range of 5 atomic % or more and 35 atomic % or less. It also includes, as an accessory component, Mo within a range of more than 0 atomic % and less than 8 atomic %, and at least one element with an atomic radius larger than those of Co, Cr, Fe and Ni within a range of more than 0 atomic % and 4 atomic % or less. And, remainder substances are inevitable impurities. The at least one element with a larger atomic radius should preferably be selected from among Ta, Nb, Hf, Zr and Y.

More specifically, content of the component Co is preferably 20 atomic % or more and 35 atomic % or less; more preferably 25 atomic % or more and 33 atomic % or less; and further preferably 25 atomic % or more and 30 atomic % or less.

Content of the component Cr is preferably 10 atomic % or more and 25 atomic % or less; more preferably 15 atomic % or more and 23 atomic % or less; and further preferably 15 atomic % or more and 20 atomic % or less.

Content of the component Fe is preferably 10 atomic % or more and 25 atomic % or less; more preferably 15 atomic % or more and 23 atomic % or less; and further preferably 15 atomic % or more and 20 atomic % or less.

Content of the component Ni is preferably 15 atomic % or more and 30 atomic % or less; more preferably 17 atomic % or more and 28 atomic % or less; and further preferably 23 atomic % or more and 28 atomic % or less.

Content of the component Ti is preferably 5 atomic % or more and 15 atomic % or less; more preferably 5 atomic % or more and 10 atomic % or less; and further preferably 7 atomic % or more and 10 atomic % or less.

Content of the component Mo is preferably more than 0 atomic % and less than 8 atomic %; more preferably 1 atomic % or more and 7 atomic % or less; and further preferably 1 atomic % or more and 5 atomic % or less.

The content of each element with a larger atomic radius (Ta, Nb, Hf, Zr or Y) should preferably be more than 0 atomic % and 4 atomic % or less, more preferably 0.5 atomic % or more and 4 atomic % or less, and even more preferably 1 atomic % or more and 3 atomic % or less.

Also, the total content of the at least one element with a larger atomic radius (selected from Ta, Nb, Hf, Zr and Y) and Mo should preferably be more than 0 atomic % and 8 atomic % or less, more preferably 1 atomic % or more and 7 atomic % or less, and even more preferably 2 atomic % or more and 6 atomic % or less.

By controlling the content of each component as above, the mechanical properties and/or corrosion resistance of the alloy article can be improved. In other words, if each component fails to fall within its preferable content range, it makes it difficult to achieve desired properties.

Herein, the inevitable impurities refer to components that are difficult to be removed completely but should be reduced as much as possible. Examples include Si (silicon), P (phosphorous), S (sulfur), N (nitrogen), and O (oxygen).

Specifically, the Si content should preferably be 0.2 mass % or less, more preferably 0.1 mass % or less, and even more preferably 0.05 mass % or less. The P content should preferably be 0.1 mass % or less, more preferably 0.05 mass % or less, and even more preferably 0.02 mass % or less. The S content should preferably be 0.1 mass % or less, more preferably 0.05 mass % or less, and even more preferably 0.02 mass % or less. The N content should preferably be 0.1 mass % or less, more preferably 0.05 mass % or less, and even more preferably 0.02 mass % or less. The 0 content should preferably be 0.2 mass % or less, more preferably 0.1 mass % or less, and even more preferably 0.05 mass % or less.

(Atomization Step)

In the atomization step S2, an alloy powder 20 is formed from the molten metal 10. The alloy powder 20 obtained in this step S2 is an embodiment of the alloy article according to the invention. There are no particular limitations on the atomization method, and any conventional method may be used. For example, gas atomizing or centrifugal force atomizing may be preferably used.

There are no particular limitations on the average particle size of the alloy powder 20, but from the viewpoint of the fluidity and fillability in forming a shape out of the alloy powder 20, it should preferably be 5 μm or more and 200 μm or less, more preferably 10 μm or more and 100 μm or less, and even more preferably 10 μm or more and 50 μm or less.

If the average particle size of the alloy powder 20 is less than 5 μm, it reduces the fluidity of the alloy powder 20 in the subsequent additive manufacturing step S3 (e.g., the formability of an alloy powder bed in additive manufacturing deteriorates), which becomes a factor of causing a poor shape accuracy of the formed article. In contrast, if the average particle size of the alloy powder 20 exceeds 200 μm, it often results in an uneven thickness of the alloy powder bed in the additive manufacturing step S3, which becomes a factor of causing an insufficient degree of melting of the alloy powder 20 or an increased surface roughness of the formed article.

Similarly, in the subsequent molding and sintering step S5, if the average particle size of the alloy powder 20 is less than 5 μm, it reduces the fluidity of the alloy powder 20 (e.g., the homogeneity of the powder filling in powder metallurgy deteriorates), which becomes a factor of causing a poor shape accuracy of the formed article or a poor consistency of the mechanical properties. In contrast, if the average particle size of the alloy powder 20 exceeds 200 μm, it becomes a factor of causing an increased surface roughness of the formed article.

(Additive Manufacturing Step)

In the additive manufacturing step S3, the alloy powder 20 prepared as above is subjected to additive manufacturing (AM) to form an alloy AM article 30 having a desired shape. The application of additive manufacturing, in which a near net shape metal member is obtained by local melting and rapid solidification instead of sintering, makes it possible to directly fabricate a three-dimensional member with a complicated shape as well as mechanical properties comparable to or better than those of forged articles. There are no particular limitations on the additive manufacturing method, and any conventional method may be used. For example, selective laser melting (SLM) should preferably be used because its solidification speed, which is important in terms of structural control, is relatively high, making it possible to achieve a relatively small surface roughness of the alloy AM article 30.

The additive manufacturing step S3 by SLM will be hereinafter described briefly. This step S3 includes two alternately repeated substeps: an alloy powder bed preparation substep S3*a* and a laser melting and solidification substep S3*b*. In the alloy powder bed preparation substep S3*a*, the alloy powder 20 is spread into an alloy powder bed with a predetermined thickness. In the laser melting and solidification substep S3*b*, a predetermined area of the alloy powder bed is irradiated with a laser beam so as to locally melt and rapidly solidify the area of the alloy powder 20.

More specifically, when the thickness h of the alloy powder bed is set at 0.002 to 0.2 mm, the output power P of the laser beam is set at 50 to 1000 W, the scanning speed S of the laser beam is set at 50 to 10000 mm/s, and the scanning interval L of the laser beam is set at 0.05 to 0.2 mm, for example, the volume energy density E of the local melting, represented by the formula $E=P/(h \times S \times L)$, should preferably be controlled to 20 to 200 $J/mm^3$ so that the density and the shape accuracy of the obtained alloy AM article 30 will become as high as possible. The volume energy density E should more preferably be controlled to be 40 to 150 $J/mm^3$.

The alloy AM article 30 formed through the above substeps is usually buried in the alloy powder bed. Therefore, a taking out substep S3*c* to take out the alloy AM article 30 from the alloy powder bed is then performed. A method to take out the alloy AM article 30 is not particularly limited, and any conventional method can be utilized. For example, a sandblasting technique using the alloy powder 20 is preferable. The sandblasting technique using the alloy powder 20 enables the removed alloy powder bed to be ground together with the blasted alloy powder 20, and the obtained alloy powder can be reused as an alloy powder 20.

A sample for microstructure observation was taken from the alloy AM article 30 after the taking out substep S3*c* and subjected to electron backscatter diffraction (EBSD) using a scanning electron microscope (SEM) to observe the crystal grain form of the sample. In an inverse pole figure map, the matrix phase of the alloy AM article 30 was observed to bristle with fine columnar crystals (with an average width of 50 μm or less) along the direction of building (the so-called local melting and rapid solidification structure). Further observation revealed that an intermetallic compound phase (e.g., $Ni_3Ti$ phase) was precipitated in the matrix phase crystals of the alloy AM article 30.

(Pseudo-Solution Heat Treatment Step)

In the pseudo-solution heat treatment step S4, the alloy AM article 30 is subjected to a pseudo-solution heat treatment to almost completely solutionize the precipitated intermetallic compound phase. An alloy formed article 31 obtained through this step S4 is another embodiment of the alloy article according to the invention. It should be noted that regarding the alloy article according to the present invention, there are no academically established findings such as phase equilibrium diagrams, and the solvus temperature of the precipitated phase is unclear. This makes it impossible to accurately define the temperature at which it is completely solutionized. For this reason, the heat treatment in this step S4 is called "pseudo-solution heat treatment".

The temperature of this heat treatment should preferably be 1000 to 1250° C., more preferably 1050 to 1200° C., and even more preferably 1100 to 1180° C. If this heat treatment temperature is less than 1000° C., it does not allow the intermetallic compound phase to be fully solutionized. In contrast, if this heat treatment temperature exceeds 1250° C., it leads to excessive coarsening of the matrix phase crystal grains, reducing the corrosion resistance and deteriorating the mechanical properties. There are no particular limitations on the heating atmosphere, and it may be the air or a non-oxidizing atmosphere (an atmosphere in which virtually no oxygen is present, such as a vacuum and a high purity argon).

Furthermore, after the alloy AM article 30 has been held within the temperature range for 0.1 to 100 hours, it should preferably be that the alloy AM article 30 is quickly cooled (e.g., by air-cooling, gas-cooling or water-cooling). Specifically, by quickly cooling (e.g., cooling at a rate of at least 10° C./s) the alloy AM article 30 to allow it to quickly pass specific temperature range (e.g., from 900 to 800° C.) in which the intermetallic compound phase tends to be re-precipitated and its particles easily grow, it is possible to obtain an alloy formed article 31 having a microstructure in which nanoscale ultrafine particles are dispersedly precipitated in the matrix phase crystal grains.

The matrix phase crystal grains in the alloy formed article 31 are equiaxed crystals with an average grain size of 150 μm or less, in which the crystal structure thereof should preferably be face-centered cubic (FCC). If the average grain size exceeds 150 μm, it deteriorates the mechanical properties and reduces the corrosion resistance. The average grain size should more preferably be 100 μm or less and more preferably 50 μm or less.

It is considered that the alloy formed article 31 exhibits both excellent mechanical properties and high corrosion resistance because it mainly contains face-centered cubic crystals, which have a kind of close-packed structure. It should be noted that the present invention does not deny the possibility that some of the matrix phase crystal grains have a simple cubic (SC) structure.

The average size of the dispersedly precipitated ultrafine particles is 100 nm or less. It should preferably be 10 nm or more and 100 nm or less, and more preferably 20 nm or more and 80 nm or less. If the average size of the ultrafine particles is less than 10 nm or more than 100 nm, it does not contribute to improving the mechanical properties. Since the average size of the ultrafine particles tends to become smaller as the cooling rate in the pseudo-solution heat treatment becomes larger, the average size of the ultrafine particles should preferably be controlled by controlling the cooling rate.

(Molding and Sintering Step)

One means of obtaining an alloy formed article without performing the above-described additive manufacturing step is performing a molding and sintering step. In this molding and sintering step S5, an alloy formed article 32 is formed from the alloy powder 20 prepared in the atomization step S2. The alloy formed article 32 obtained in the step S5 is also another embodiment of the alloy article according to the present invention. To ensure that the alloy formed article 32 is close-packed, hot isostatic pressing (HIP) should preferably be used as a powder metallurgy process.

The sintering temperature may be the same as that in the pseudo-solution heat treatment step S4. More specifically, it should preferably range from 1,000 to 1250° C., more preferably 1050 to 1200° C., and even more preferably 1,100 to 1,180° C. Similarly to the case with the pseudo-solution heat treatment step S4, the molded body should preferably be held at a temperature within such a range for 0.1 to 100 hours and then rapidly cooled (e.g., air-cooled or water-cooled).

Controlling the press pressure, the sintering temperature and the holding duration so as to achieve a porosity of 10% or less and controlling the cooling rate after the sintering (in particular, within a temperature range from 900 to 800° C.) as above allows the obtained alloy formed article 32 to have a microstructure in which nanoscale ultrafine particles are dispersedly precipitated in the matrix phase crystal grains.

This step S5 is a step suitable for manufacturing a formed article with a relatively simple shape. Also, the step S5 has the advantage that it contributes to cost reduction as it has higher mass productivity than the combination of the above-described additive manufacturing step S3 and pseudo-solution heat treatment steps S4.

[Products Formed of Alloy Article]

Figure 2:
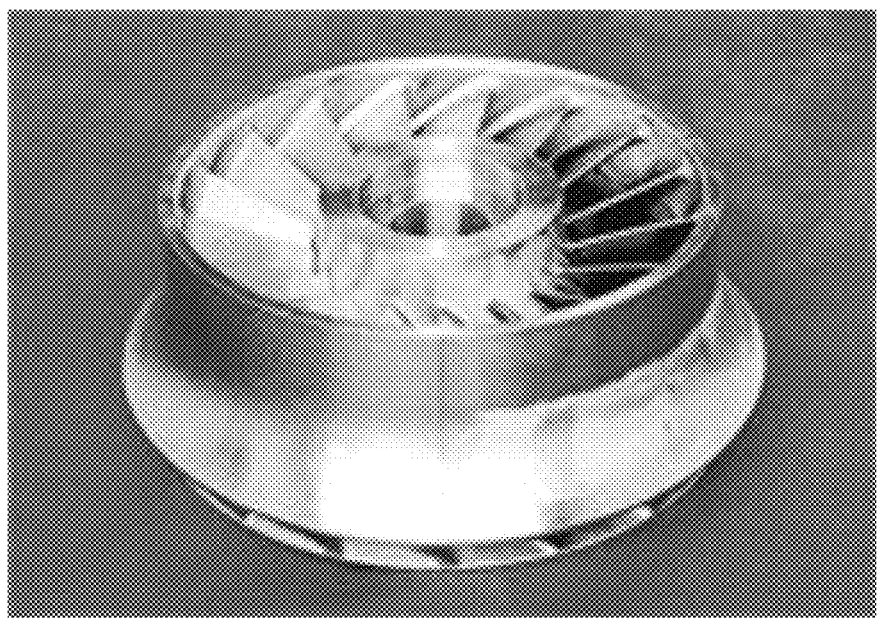
FIG. 2 shows an example of a product formed of an alloy article according to the invention, and is a photograph of an impeller of a fluid machine.

FIG. 2 shows an example of a product formed of an alloy article according to the invention, and is a photograph of an impeller of a fluid machine. Since a product according to the invention is manufactured by an additive manufacturing method, it is possible to easily form an object with a complicated shape as shown in FIG. 2. Furthermore, the impeller formed of the alloy article according to the invention has both excellent mechanical characteristics and high corrosion resistance; therefore, it is significantly durable even in severe operating environments. A product of the invention can include piping parts and drilling parts etc. in addition to impellers.

[Fluid Machine Having Product]

Figure 3:
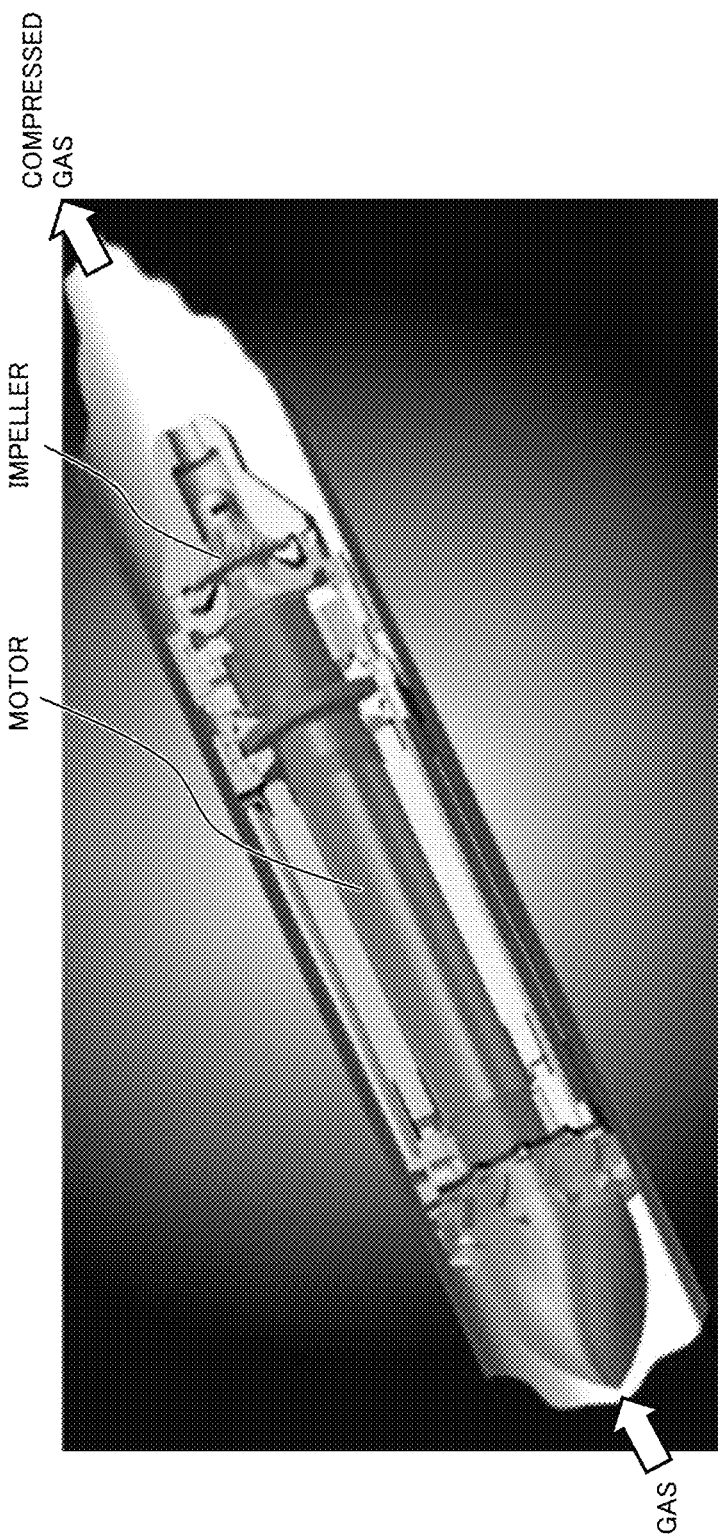
FIG. 3 shows an example of a fluid machine having a product according to the invention, and is a schematic drawing illustrating a cross-sectional view of a centrifugal compressor into which the impeller according to the invention is incorporated.

FIG. 3 shows an example of a fluid machine having a product according to the invention, and is a schematic drawing illustrating a cross-sectional view of a centrifugal compressor into which the impeller (see FIG. 2) according to the invention is incorporated. The use of the impeller of the invention, which is significantly durable even in severe operating environments, will contribute to the improved long-term reliability of the centrifugal compressor.

EXAMPLES

Hereinafter, the invention will be described more specifically by showing experimental examples. However, the invention is not limited to those experimental examples.

[Experiment 1]

(Preparation of Alloy Powders P1 to P9)

The raw material mixing and melting step was conducted, in which raw materials were mixed so as to have nominal composition shown in Table 1 and melted with a high frequency melting furnace to form a molten metal. Then, the atomizing step was conducted using the gas atomizing technique to form an alloy powder from the molten metal. Subsequently, the obtained alloy powder was sieved into a particle diameter range from 20 to 45 μm. Thus, alloy powders P1 to P9 were prepared. Then, the particle size distributions of the alloy powders P1 to P9 were measured by means of a laser diffraction particle size distribution measuring apparatus. The result indicates that the average particle diameter of each powder was approximately 30 μm.

TABLE 1

Nominal composition of alloy powders P1 to P9 (unit: atomic %).

| Alloy powder | Co | Cr | Fe | Ni | Ti | Mo | Ta | Nb | Hf | Zr | Y |
|---|---|---|---|---|---|---|---|---|---|---|---|
| P1 | 26.8 | 17.9 | 17.9 | 26.7 | 8.9 | 1.8 | — | — | — | — | — |
| P2 | 26.3 | 17.5 | 17.5 | 26.3 | 8.8 | 1.8 | 1.8 | — | — | — | — |
| P3 | 26.0 | 17.3 | 17.3 | 26.0 | 8.7 | 1.7 | 3.0 | — | — | — | — |
| P4 | 26.3 | 17.5 | 17.5 | 26.3 | 8.8 | 1.8 | — | 1.8 | — | — | — |
| P5 | 26.3 | 17.5 | 17.5 | 26.3 | 8.8 | 1.8 | 0.9 | 0.9 | — | — | — |
| P6 | 25.5 | 17.0 | 17.0 | 25.5 | 8.3 | 1.7 | — | 5.0 | — | — | — |
| P7 | 26.0 | 17.7 | 17.5 | 25.0 | 8.3 | 3.9 | — | — | 1.6 | — | — |
| P8 | 26.9 | 17.5 | 17.7 | 25.1 | 8.3 | 2.9 | — | — | — | 1.6 | — |
| P9 | 26.0 | 17.8 | 17.5 | 26.0 | 8.7 | 2.1 | — | — | — | — | 1.9 |

"—" in Table 1 indicates the element was not intentionally included.

As shown in Table 1, the alloy powder P1 is a conventional HEA powder which does not contain any element with a larger atomic radius (Ta, Nb, Hf, Zr, or Y) and prepared as a reference sample for the present invention. Each of the alloy powders P2 to P5 and the alloy powders P7 to P9 is an HEA powder as an alloy article according to an embodiment of the invention. The alloy powder P6 fails to meet the specifications of the invention (with an excessive Nb content) and is prepared as a comparative example.

[Experiment 2]

Fabrication of Alloy Formed Articles FA1 to FA9) Each of the alloy powders P1 to P9 prepared in Experiment 1 was subjected to SLM according to the additive manufacturing step S3 described above using an additive manufacturing device (a product of EOS GmbH, model: EOSINT M290) to form an alloy AM article (a prismatic article, 25 mm in length×25 mm in width×mm in height, the height direction was the direction of building). The thickness h of the alloy powder bed was set at 0.04 mm, and the output power P, the scanning speed S, and the scanning interval L of the laser beam were controlled such that the volume energy density E would fall within the range of 40 to 100 J/mm$^3$. Also, in order to eliminate the influence of the Ar gas flow circulating in the shape-formation area, the alloy powder bed was rotated layer by layer in-plane at an angle of about 67°.

After the taking out substep, the pseudo-solution heat treatment step was performed for the alloy AM articles, wherein the alloy AM articles were held at 1180° C. for 3 hours in the atmospheric air and then rapidly cooled, so as to produce alloy formed articles FA1 to FA9. In the rapid cooling process, the alloy AM articles heated were cooled using an air-cooling method (at an average cooling rate of approximately 10° C./s at a temperature from 900 to 800° C.)

[Experiment 3]
(Microstructure Observation of Alloy AM Articles)

A test specimen for microstructure observation was sampled from each of the alloy AM articles fabricated in Experiment 2, and subjected to microstructure observation by an electron backscatter diffraction (EBSD) method using a scanning electron microscope (SEM).

Figure 4:
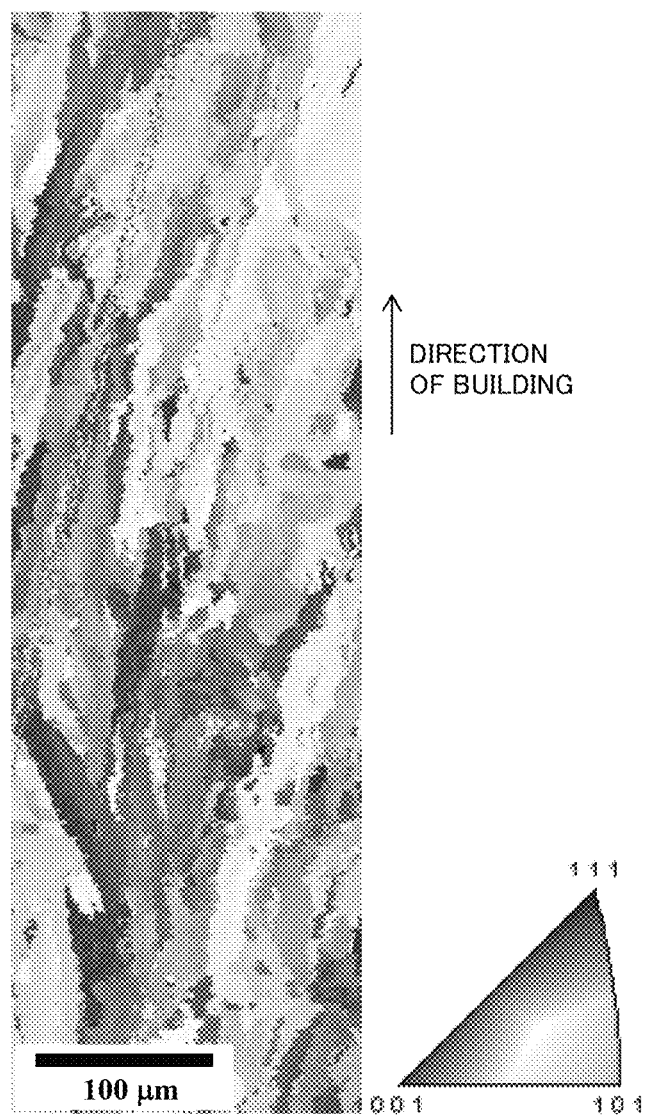
FIG. 4 is an inverse pole figure map showing an example of a microstructure of an alloy AM article formed from alloy powder P2, viewed from a direction perpendicular to a building direction.

FIG. 4 is an inverse pole figure map showing an example of the microstructure of the alloy AM article formed from the alloy powder P2, viewed from a direction perpendicular to the building direction. Herein, any boundary with a misorientation of 3° or more between the two adjacent crystals in an inverse pole figure map (IPF map) is judged as a crystal boundary. As shown in FIG. 4, the alloy AM article of the invention has no traces of the alloy powder, which is the starting material of the additive manufacturing, to be found (i.e., at least it does not have a sintered structure), and it is observed to have a microstructure that bristles with narrow columnar crystal grains (e.g., with an average width of 50 μm or less) substantially along the direction of building of the alloy AM article. Such a structure is characteristic of local melting and rapid solidification.

It was separately confirmed that the other alloy AM articles also had a similar microstructure.

(Microstructure Observation of Alloy Formed Articles FA1 to FA9)

A test specimen for microstructure observation was sampled from each of the alloy formed articles FA1 to FA9 fabricated in Experiment 2 and subjected to microstructure observation and assessment using an SEM, a scanning transmission electron microscope/energy-dispersive X-ray analyzer (STEM-EDX), and an X-ray diffractometer (XRD).

Figure 5A:
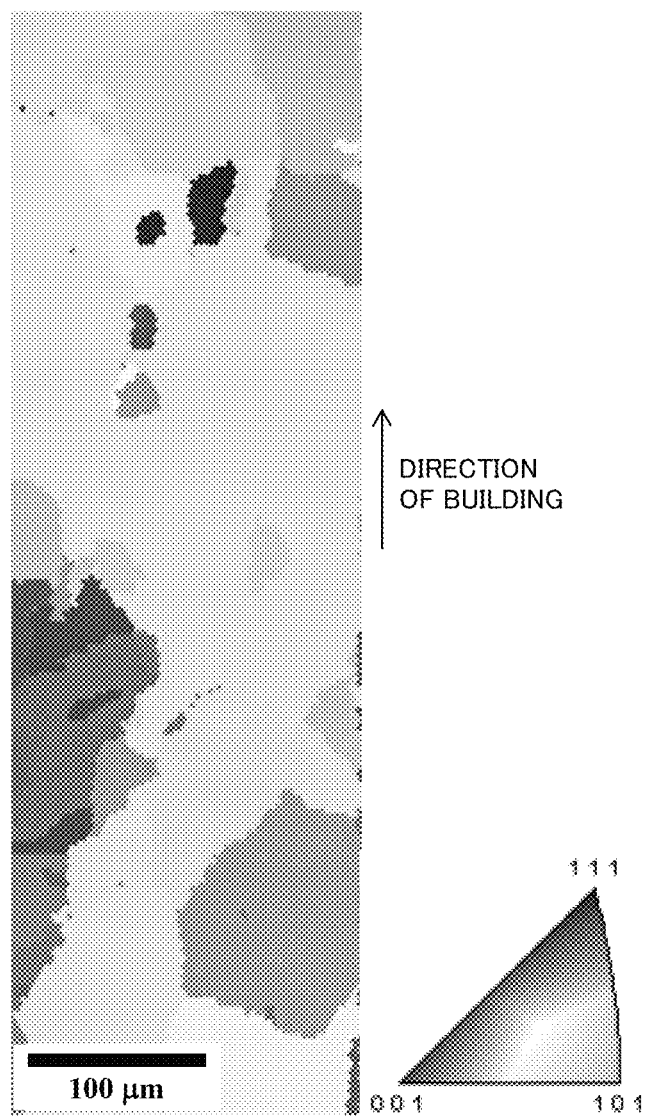
FIG. 5A is an inverse pole figure map showing an example of a microstructure of alloy formed article FA2, formed from the alloy powder P2, viewed from a direction perpendicular to the building direction.
Figure 5B:
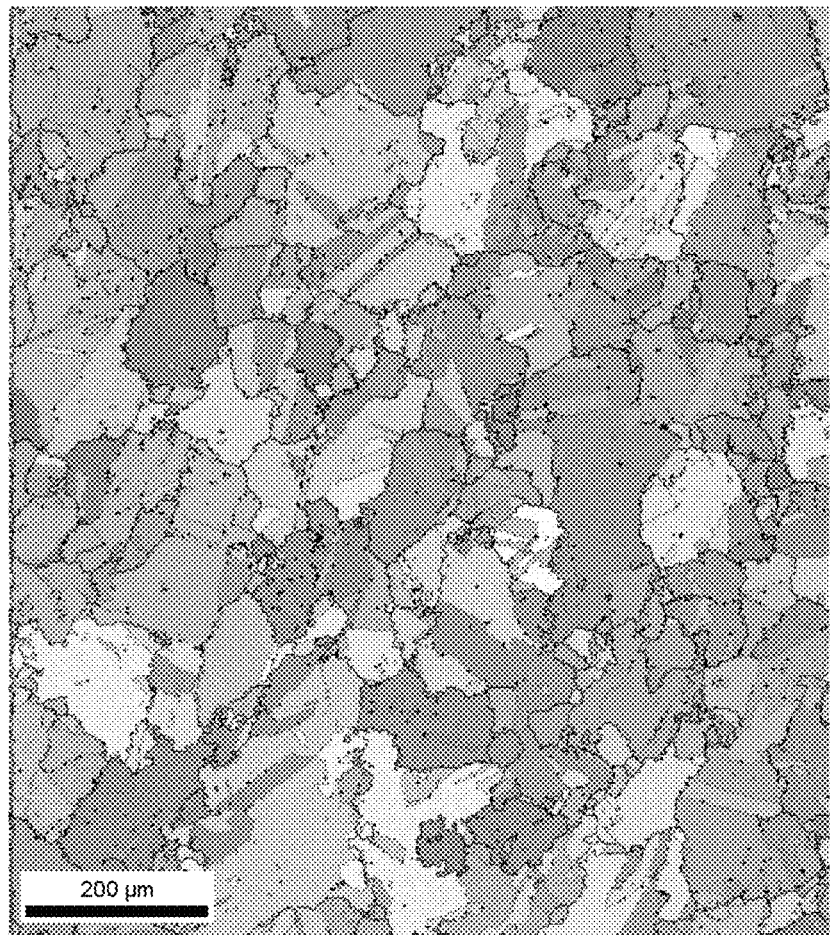
FIG. 5B is an inverse pole figure map showing an example of a microstructure of the alloy formed article FA2, formed from the alloy powder P2, viewed from the building direction.

FIG. 5A is an inverse pole figure map showing an example of the microstructure of the alloy formed article FA2, formed from the alloy powder P2, viewed from a direction perpendicular to the building direction. FIG. 5B is an inverse pole figure map showing an example of the microstructure of the alloy formed article FA2, formed from the alloy powder P2, viewed from the building direction.

As shown in FIG. 5A and FIG. 5B, the alloy formed article FA2 according to the invention has a matrix phase structure including equiaxed crystals with an average crystal grain size of 150 μm or less. Also, the matrix phase structure of the alloy formed article according to the invention (the matrix phase structure of an alloy formed article obtained by performing the pseudo-solution heat treatment on an alloy AM article) has matrix phase crystal grains that are significantly different in shape and size from those shown in FIG. 4, indicating that it is a structure that has undergone recrystallization due to the pseudo-solution heat treatment.

XRD measurements revealed that the matrix phase crystal grains were mainly face-centered cubic (FCC) crystals. Meanwhile, since it is difficult to completely differentiate FCC crystals from simple cubic (SC) crystals based on the XRD measurement results, it cannot be concluded that none of the matrix phase crystal grains are SC crystals. Also, except for the alloy formed article FA6, formed from the alloy powder P6, no diffraction peak of an intermetallic compound precipitation phase was detected. This suggests that if any precipitation phase is present, its size is extremely small.

In contrast, with the alloy formed article FA6, formed from the alloy powder P6, the diffraction peak of an intermetallic compound phase, which was thought to be $Ni_3Nb$, was detected. This is attributable to the fact that the alloy powder P6 is an alloy powder with an excessive Nb content.

Figure 6:
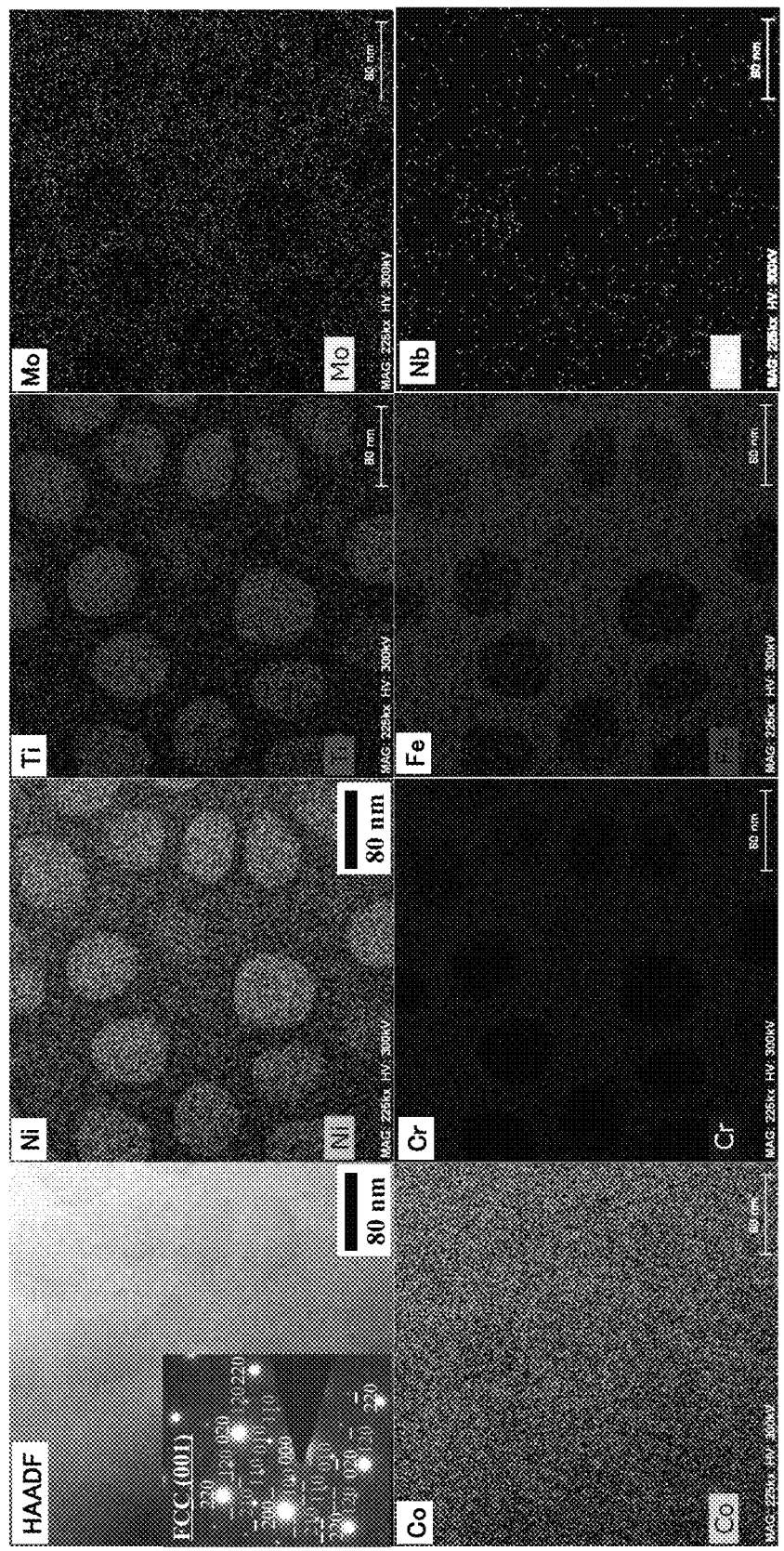
FIG. 6 is a high-angle annular dark-field image (HAADF image) with elemental maps and an electron diffraction pattern of ultrafine particles using a scanning transmission electron microscope/energy-dispersive X-ray analyzer (STEM-EDX), showing an example of a microstructure of alloy formed article FA5, formed from alloy powder P5.

FIG. 6 is a high-angle annular dark-field image (HAADF image) with elemental maps and an electron diffraction pattern of ultrafine particles using STEM-EDX, showing an example of the microstructure of the alloy formed article FA5, formed from the alloy powder P5. As shown in FIG. 6, the HAADF image and the elemental maps indicate precipitation of ultrafine particles with an average size of 100 nm or less. The electron diffraction pattern of ultrafine particles indicates that the ultrafine particles are crystalline particles. Also, the elemental maps indicate that Ni and Ti constituents are concentrated in the ultrafine particles than in the matrix phase.

Figure 7:
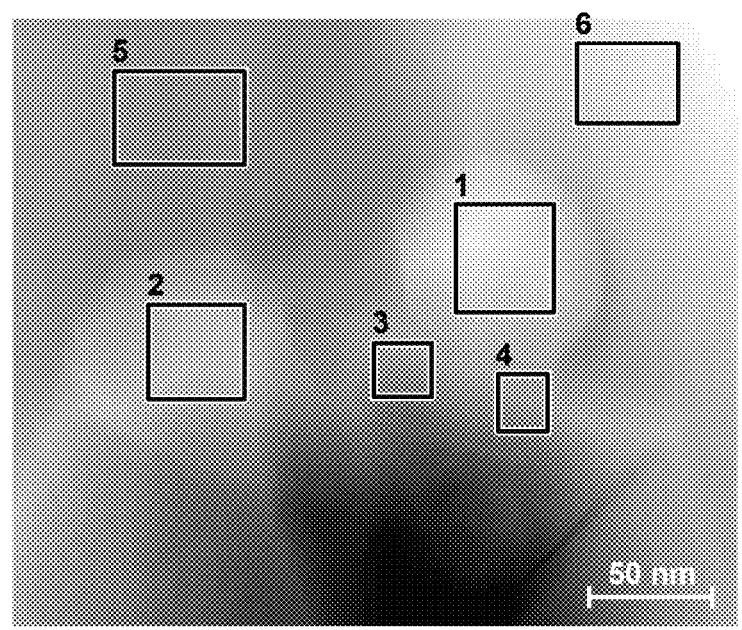
FIG. 7 is an HAADF image showing an example of a microstructure of alloy formed article FA4, formed from alloy powder P4.

FIG. 7 is an HAADF image showing an example of the microstructure of the alloy formed article FA4, formed from the alloy powder P4. In FIG. 7, similarly to the case of FIG. 6, the image indicates precipitation of ultrafine particles with an average size of 100 nm or less. Also, quantitative analysis was performed on the regions 1 to 6 in the rectangular frames (regions 1 to 4: ultrafine particle, regions 5 and 6: matrix phase crystal) for the quantities of the constituent elements of the alloy formed article FA4. The results are shown in Table 2.

TABLE 2

Quantitative analysis results of constituent elements of alloy formed article in regions 1 to 6 in FIG. 7 (unit: atomic %).

|  | Co | Cr | Fe | Ni | Ti | Mo | Nb |
|---|---|---|---|---|---|---|---|
| Region 1 | 31.0 | 12.3 | 15.6 | 18.3 | 10.6 | 3.3 | 8.0 |
| Region 2 | 29.5 | 12.6 | 16.4 | 17.9 | 9.8 | 3.7 | 8.2 |
| Region 3 | 23.9 | 2.7 | 6.1 | 42.4 | 19.4 | 0.8 | 1.9 |
| Region 4 | 25.0 | 2.9 | 7.3 | 44.2 | 16.4 | 0.6 | 2.6 |
| Region 5 | 26.6 | 18.0 | 17.9 | 24.4 | 6.5 | 1.0 | 1.9 |
| Region 6 | 27.2 | 16.3 | 18.5 | 26.5 | 6.8 | 1.2 | 1.8 |

FIG. 7 and Table 2 indicate that the ultrafine particles in the regions 1 and 2 are crystalline particles in which an element with a larger atomic radius (here, the Nb component) is concentrated than in the matrix phase crystals (the regions 5 and 6). They also indicate that the ultrafine particles in the regions 3 and 4 are crystalline particles in that the Ni component and the Ti component are concentrated than in the matrix phase crystals (the regions 5 and 6).

It was separately confirmed that the other alloy formed articles also had a similar microstructure.

[Experiment 4]
Measurement of Mechanical Properties and Corrosion Resistance of Alloy Formed Articles FA1 to FA6)

A test specimen for tensile test (diameter of the parallel portion: 4 mm, length of the parallel portion: 20 mm) was sampled from each of the alloy formed articles FA1 to FA9 fabricated in Experiment 2. The test specimens of the alloy formed articles were taken so that the longitudinal direction of the test specimen matched the building direction (additive manufacturing direction).

Using a material universal testing machine, the room-temperature tensile test was conducted for each test specimen in accordance with JIS Z 2241 at a rate of strain of $5 \times 10^{-5}$ $s^{-1}$, and the tensile strength was measured. From 5 measurements of the tensile test, the maximum value and the minimum value were excluded, and the average value of the remaining 3 measurements was obtained. To evaluate the tensile strength, the value of less than 1200 MPa was judged to be "Failed", the value of 1200 MPa or more was judged to be "Passed", and the value of 1600 MPa or more was judged to be "Excellent". The results are shown in Table 3.

Also, corrosion resistance was measured for each of the alloy formed articles fabricated in Experiment 2. A test specimen (10 mm in length×10 mm in width×3 mm in thickness) was sampled from each of the alloy formed articles and immersed in 5% boiling sulfuric acid at 375 K for 48 hours to measure the corrosion rate (the mass decrement per unit area and unit time) in accordance with JIS G 0591: 2012. To evaluate the corrosion resistance, the corrosion rate of 0.9 g/m²/h or more was judged to be "Failed", the corrosion rate of less than 0.9 g/m²/h was judged to be "Passed", and the corrosion rate of less than 0.5 g/m²/h was judged to be "Excellent". The results are shown in Table 3.

TABLE 3

Measurement results of mechanical property and corrosion resistance of alloy formed articles FA1 to FA6.

| Alloy formed article | Alloy powder | Mechanical property | | Corrosion resistance | |
|---|---|---|---|---|---|
| | | Tensile strength (MPa) | Evaluation | Corrosion rate for 48 h immersion (g/m²/h) | Evaluation |
| FA1 | P1 | 1414 | Passed | 0.78 | Passed |
| FA2 | P2 | 1439 | Passed | 0.08 | Excellent |
| FA3 | P3 | 1582 | Passed | 0.48 | Excellent |
| FA4 | P4 | 1504 | Passed | 0.12 | Excellent |
| FA5 | P5 | 1452 | Passed | 0.10 | Excellent |
| FA6 | P6 | 1595 | Passed | 0.96 | Failed |

As shown in Table 3, the alloy formed articles FA2 to FA5, formed of the alloy powders P2 to P5 according to the invention, each exhibits a tensile strength of 1200 MPa or more. In other words, it is demonstrated that they have an excellent mechanical property comparable to or better than that of the conventional alloy formed article FA1, which serves as a reference sample. Regarding corrosion resistance, since the alloy formed articles FA2 to FA5 according to the invention each exhibits a corrosion rate of less than 0.5 g/m²/h, it is demonstrated that they have better corrosion resistance than that of the alloy formed article FA1 as the reference sample. In contrast, the corrosion resistance of the alloy formed article FA6, as the comparative example, is judged to be "Failed", although its mechanical property is excellent.

[Experiment 5]

(Measurement of Mechanical Properties and Corrosion Resistance of Alloy Formed Articles FA7 to FA9)

A test specimen (10 mm in length×10 mm in width×3 mm in thickness) was sampled from each of the alloy formed articles FA1 and FA7 to FA9 fabricated in Experiment 2 to measure the mechanical properties and corrosion resistance of each alloy formed article. Here, as a representative mechanical property, Vickers hardness was measured at ten points using a Vickers hardness tester (a product of Shimadzu Corporation, micro Vickers hardness tester, model: HMV), and the average of the eight values calculated after excluding the maximum and minimum values was used as the Vickers hardness of the alloy formed article. Regarding the evaluation of Vickers hardness, any hardness of less than 380 Hv was judged to be "Failed", any hardness of 380 Hv or more was judged to be "Passed", and any hardness of 500 Hv or more was judged to be "Excellent". The results are shown in Table 4.

Also, based on the obtained average value of Vickers hardness, the tensile strength of each alloy formed article was calculated using the following approximate conversion formula: tensile strength (unit: MPa)=3.12×Vickers hardness (unit: Hv)+16. The results are shown in Table 4.

The corrosion resistance of each alloy formed article was measured as follows. Each test specimen was immersed in 5% boiling sulfuric acid at 375 K for 6 hours to measure the corrosion rate (the mass decrement per unit area and unit time) in accordance with JIS G 0591: 2012. Regarding the evaluation of corrosion resistance, similarly to the case of Experiment 4, any corrosion rate of 0.9 g/m²/h or more was judged to be "Failed", any corrosion rate of less than 0.9 g/m²/h was judged to be "Passed", and any corrosion rate of less than 0.5 g/m²/h was judged to be "Excellent". The results are shown in Table 4.

TABLE 4

Measurement results of mechanical properties and corrosion resistance of alloy formed articles FA1 and FA7 to FA9.

| Alloy formed article | Alloy powder | Mechanical properties | | | Corrosion resistance | |
|---|---|---|---|---|---|---|
| | | Vickers hardness (Hv) | Evaluation | Converted tensile strength (MPa) | Corrosion rate for 6 h immersion (g/m²/h) | Evaluation |
| FA1 | P1 | 453 | Passed | — | 0.70 | Passed |
| FA7 | P7 | 513 | Excellent | 1617 | 0.67 | Passed |
| FA8 | P8 | 548 | Excellent | 1726 | 0.65 | Passed |
| FA9 | P9 | 588 | Excellent | 1851 | 0.81 | Passed |

As shown in FIG. 4, the alloy formed articles FA7 to FA9, formed from the alloy powders P7 to P9 according to the invention, each exhibits a Vickers hardness of 500 Hv or more. In other words, it is confirmed that they have better mechanical properties than those of the conventional alloy formed article FA1 as the reference sample. Moreover, regarding corrosion resistance, since the alloy formed articles FA7 to FA9 according to the invention each exhibit a corrosion rate of less than 0.9 g/m²/h, it is confirmed that they have corrosion resistance comparable to that of the alloy formed article FA1 as the reference sample.

[Experiment 6]

(Fabrication of Alloy Formed Articles FA2W, FA4W and FA5W)

An alloy AM article (a prismatic article, 25 mm in length×25 mm in width×70 mm in height, the height direction was the direction of building) was formed from each of the alloy powders P2, P4 and P5 prepared in Experiment 1 in the same manner as Experiment 2. The obtained alloy AM articles were subjected to pseudo-solution heat treatment (held at 1180° C. for 3 hours in the air, then water cooled, the cooling rate in the temperature range from 900 to 800° C. was about 100° C./s) to fabricate alloy formed articles FA2W, FA4W and FA5W. This experiment was conducted to study the influence of the method of rapid cooling (cooling rate) in the pseudo-solution heat treatment.

[Experiment 7]
(Microstructure Observation of Alloy Formed Articles FA2W, FA4W and FA5W)

A test specimen for microstructure observation was sampled from the alloy formed articles FA2W, FA4W and FA5W fabricated in Experiment 6, and subjected to microstructure observation and evaluation using an SEM and an STEM-EDX.

Figure 8:
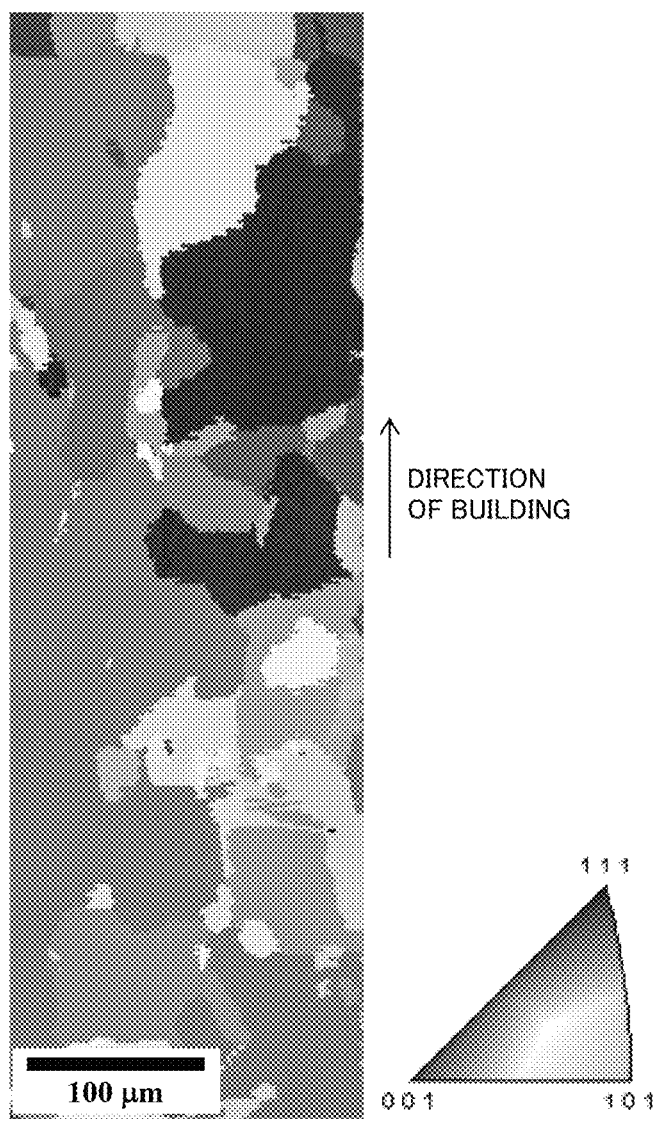
FIG. 8 is an inverse pole figure map showing an example of a microstructure of alloy formed article FA2W, formed from the alloy powder P2, viewed from a direction perpendicular to the building direction.

FIG. 8 is an inverse pole figure map showing an example of the microstructure of the alloy formed article FA2W, formed from the alloy powder P2, viewed from a direction perpendicular to the building direction. As shown in FIG. 8, the matrix phase structure of the alloy formed article according to the invention includes matrix phase crystal grains with a smaller average size than that in FIG. 5A. This is attributable to the fact that the cooling rate in the pseudo-solution heat treatment step was faster than in Experiment 2.

Here, regarding the dispersed precipitation strengthening of a metal material, it is known that the mechanical strength (e.g., yield stress) of the metal material increases in proportion to ½ power of the product of "the radius of a precipitate" and "the volume ratio of the precipitate to the matrix phase crystal grains". Therefore, because the average size of the matrix phase crystal grains varied due to the cooling rate, the inventors examined the average size of the ultrafine particles precipitated in the matrix phase crystals and "the product of the radius of a precipitate and the volume ratio of the precipitate to the matrix phase crystal grains".

"The volume ratio of the precipitate to the matrix phase crystal grains" was determined by performing image analysis on each of the obtained electron microscope observation images using an image analysis software program (ImageJ, the public-domain image processing software developed at the National Institute of Health (NIH) in U.S.A.) to measure the average particle size of the precipitate (ultrafine particles) and the area ratio of the precipitate (ultrafine particles) and by converting them into a volume ratio. The results are shown in Table 5. For comparison, Table 5 also shows the results for the alloy formed articles FA2, FA4 and FA5 fabricated under the conditions of Experiment 2.

As shown in Table 5, the alloy formed articles FA2W, FA4W and FA5W, fabricated in Experiment 6, each contains ultrafine particles with a smaller average particle size and a higher precipitation ratio than those of FA2, FA4 and FA5, fabricated in Experiment 2, respectively. As a result, "the product of the radius of a precipitate and the volume ratio of the precipitate to the matrix phase crystal grains" is 4 nm for the alloy formed articles FA2W, FA4W and FA5W and 9 nm for the alloy formed articles FA2, FA4 and FA5.

It is said that "the product of the radius of a precipitate and the volume ratio of the precipitate to the matrix phase crystal grains" should preferably be 16 nm or less in terms of ductility and that if the product exceeds 16 nm, it drastically reduces the ductility of the article. Since the value of the product is 16 nm or less for all of the alloy formed articles FA2W, FA4W and FA5W, fabricated in Experiment 6, and the alloy formed articles FA2, FA4 and FA5, fabricated in Experiment 2, these alloy formed articles are all expected to exhibit good ductility.

[Experiment 8]
(Measurement of Mechanical Properties and Corrosion Resistance of Alloy Formed Articles FA2W, FA4W and FA5W)

The alloy formed articles FA2W, FA4W and FA5W fabricated in Experiment 6 were subjected to measurements and evaluation of the mechanical properties and corrosion resistance in a similar way in Experiment 4. The results are shown in Table 6.

TABLE 6

Measurement results of mechanical property and corrosion resistance of alloy formed articles FA2W, FA4W, and FA5W.

| Alloy formed article | Alloy powder | Mechanical property | | Corrosion resistance | |
|---|---|---|---|---|---|
| | | Tensile strength (MPa) | Evaluation | Corrosion rate for 48 h immersion (g/m$^2$/h) | Evaluation |
| FA2W | P2 | 1393 | Passed | 0.10 | Excellent |
| FA4W | P4 | 1455 | Passed | 0.16 | Excellent |
| FA5W | P5 | 1405 | Passed | 0.13 | Excellent |

As shown in Table 6, each of the alloy formed articles FA2W, FA4W and FA5W exhibits a tensile strength of 1200 MPa or more, thus being verified that they have an excellent mechanical property. In addition, regarding corrosion resistance, all of the alloy formed articles FA2W, FA4W and FA5W exhibit a corrosion rate of less than 0.5 g/m$^2$/h, thus being verified that they have an excellent corrosion resistance.

TABLE 5

Results of microstructure observation for alloy formed articles FA2W, FA2, FA4W, FA4, FA5W, and FA5.

| Alloy formed article | Alloy powder | Average particle size of ultrafine particles (nm) | Volume ratio of ultrafine particles (volume %) | "Average radius of ultrafine particles" × "volume ratio of ultrafine particles to matrix phase crystal grains" (nm) |
|---|---|---|---|---|
| FA2W | P2 | 20 | 40 | 4 |
| FA2 | | 70 | 26 | 9 |
| FA4W | P4 | 20 | 40 | 4 |
| FA4 | | 70 | 26 | 9 |
| FA5W | P5 | 20 | 40 | 4 |
| FA5 | | 70 | 26 | 9 |

Here, while the alloy formed articles FA2W, FA4W and FA5W exhibit lower tensile strength (see Table 3) due to their slightly smaller values of "the product of the radius of a precipitate and the volume ratio of the precipitate to the matrix phase crystal grains" (see Table 5) than the alloy formed articles FA2, FA4 and FA5 fabricated in Experiment 2, the alloy formed articles FA2W, FA4W and FA5W are expected to exhibit better ductility instead.

As has been described above, it has been demonstrated that according to the present invention, there can be provided an alloy article that exhibits even better mechanical properties and/or even higher corrosion resistance than conventional HEA articles without sacrificing the attractive properties of conventional HEAs, a product formed of the article, and a fluid machine having the product.

The above-described embodiments and experimental examples have been specifically given in order to help with understanding on the present invention, but the invention is not limited to the described embodiments and experimental examples. For example, a part of an embodiment may be replaced by known art, or added with known art. That is, a part of an embodiment of the invention may be combined with known art and modified based on known art, as far as no departing from a technical concept of the invention.

LEGEND

10 . . . molten metal;
20 . . . alloy powder;
30 . . . alloy AM article; and
31, 32 . . . alloy formed article.

The invention claimed is:

1. An article that is additively manufactured from an alloy, the article comprising:
matrix phase crystal grains that are equiaxed crystals with an average crystal grain size of 150 µm or less, wherein the equiaxed crystals comprise face-centered cubic crystals; and
ultrafine particles with an average particle size of 100 nm or less, wherein the ultrafine particles are dispersedly precipitated in the matrix phase crystal grains and the ultrafine particles contain a greater concentration of an additional element than in the matrix phase,
wherein the alloy is a high entropy alloy that has a chemical composition consisting of:
Co within a range of 20 atomic % or more and 35 atomic % or less;
Cr within a range of 10 atomic % or more and 25 atomic % or less;
Fe within a range of 10 atomic % or more and 25 atomic % or less;
Ni within a range of 15 atomic % or more and 30 atomic % or less;
Ti within a range of 5 atomic % or more and 15 atomic % or less;
Mo within a range of 1 atomic % or more and 5 atomic % or less;
the additional element within a range of more than 0 atomic % and 4 atomic % or less,
wherein the additional element consists of at least one from among Ta, Nb, Hf, Zr, and Y; and
a balance of inevitable impurities.

2. The article according to claim 1, wherein a total content of the additional element and the Mo is 8 atomic % or less.

3. The article according to claim 1, wherein the ultrafine particles comprise crystalline particles in that the Ni and the Ti are concentrated more than in the matrix phase crystal grains.

4. The article according to claim 1, wherein a product of a half of the average particle size of the ultrafine particles and a volume ratio of the ultrafine particles in the matrix phase crystal grains is 16 nm or less.

5. The alloy according to claim 1, wherein a content of the Ti is 7 atomic % or more and 15 atomic % or less.

6. The article according to claim 1,
wherein the article has a corrosion rate of less than 0.9 g/m²/h when the article is immersed in 5% boiling sulfuric acid at 375 K.

7. The article product according to claim 6, wherein the corrosion rate is less than 0.5 g/m²/h.

8. The article according to claim 6, wherein the article is an impeller of a fluid machine.

9. A fluid machine, incorporating the impeller according to claim 8.

10. The fluid machine according to claim 9, wherein the fluid machine is a compressor or a pump.

11. An article that is additively manufactured from an alloy, the article comprising:
matrix phase crystal grains that are equiaxed crystals with an average crystal grain size of 150 µm or less, wherein the equiaxed crystals comprise face-centered cubic crystals; and
ultrafine particles with an average particle size of 100 nm or less, wherein the ultrafine particles are dispersedly precipitated in the matrix phase crystal grains and the ultrafine particles contain a greater concentration of an additional element than in the matrix phase,
wherein the alloy is a high entropy alloy that has a chemical composition consisting of:
Co within a range of 20 atomic % or more and 35 atomic % or less;
Cr within a range of 10 atomic % or more and 25 atomic % or less;
Fe within a range of 10 atomic % or more and 25 atomic % or less;
Ni within a range of 15 atomic % or more and 30 atomic % or less;
Ti within a range of 5 atomic % or more and 15 atomic % or less;
Mo within a range of more than 0 atomic % and 5 atomic % or less;
the additional element within a range of more than 0 atomic % and 4 atomic % or less,
wherein the additional element consists of at least one from among Ta, Nb, Hf, Zr, and Y, and a total content of the additional element and the Mo is within a range of 2 atomic % or more and 6 atomic % or less; and
a balance of inevitable impurities.

12. The article according to claim 11, wherein the ultrafine particles comprise crystalline particles in that the Ni and the Ti are concentrated more than in the matrix phase crystal grains.

13. The may article according to claim 11, wherein a product of a half of the average particle size of the ultrafine particles and a volume ratio of the ultrafine particles in the matrix phase crystal grains is 16 nm or less.

14. The article according to claim 11, wherein a content of the Ti is 7 atomic % or more and 15 atomic % or less.

* * * * *